April 10, 1934.  F. L. DORNBROOK ET AL  1,954,350
APPARATUS FOR TREATING PULVERIZED FUEL SUCH AS COAL AND THE LIKE
Filed March 28, 1931  2 Sheets-Sheet 2
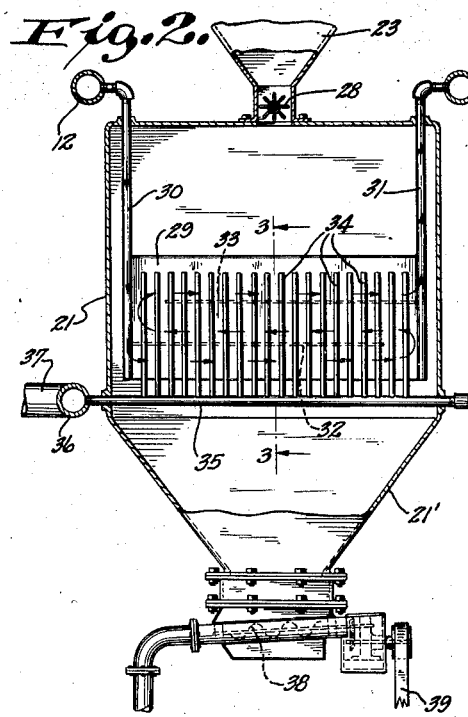
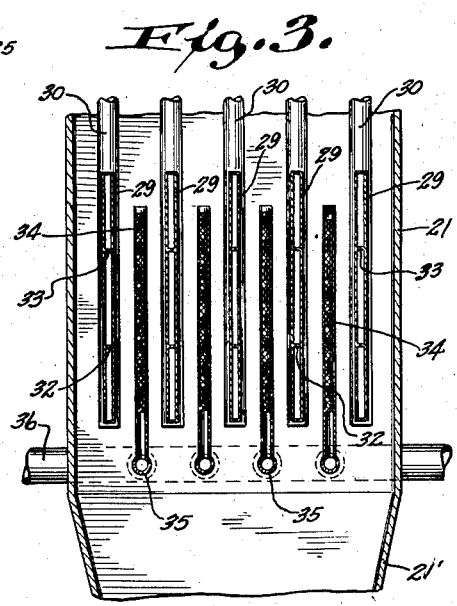
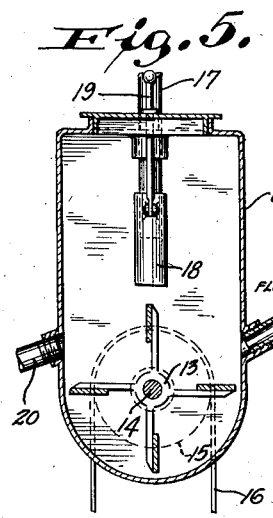
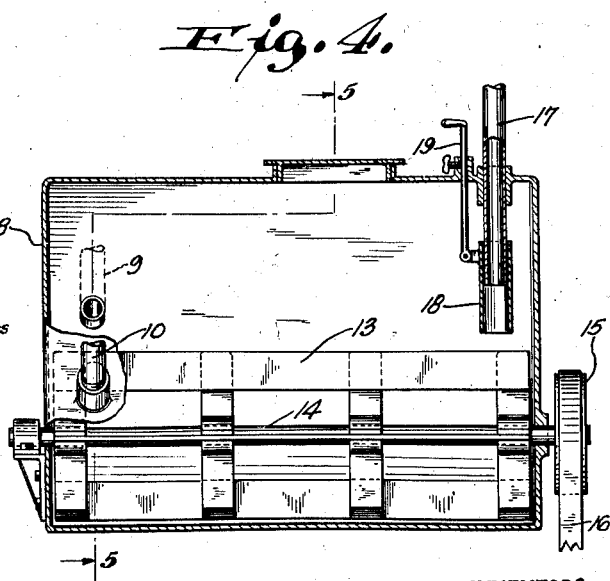
INVENTORS
F. L. Dornbrook
and M. K. Drewry
BY
Morsell & Morsell
ATTORNEY.

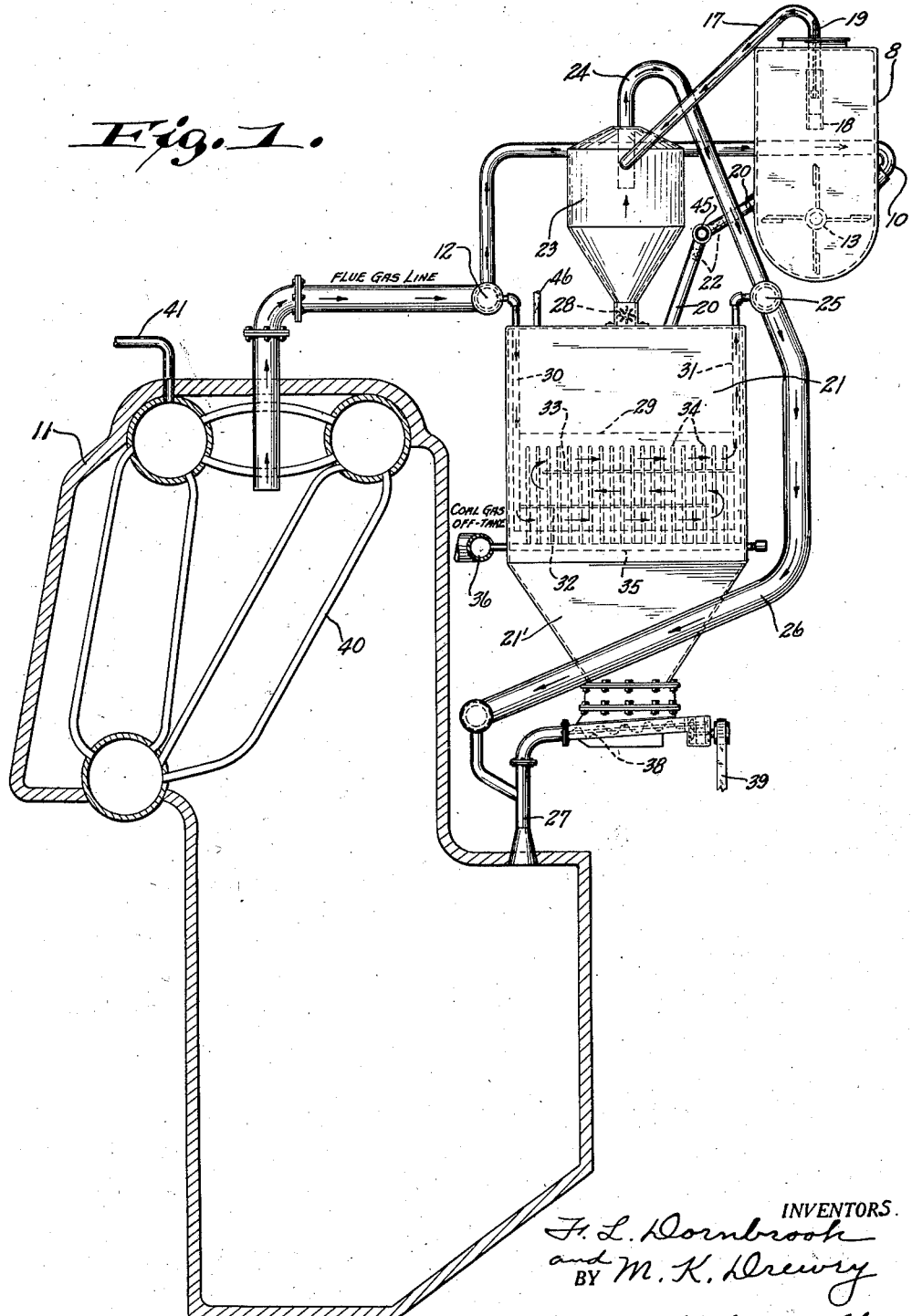

Patented Apr. 10, 1934

1,954,350

UNITED STATES PATENT OFFICE 1,954,350

APPARATUS FOR TREATING PULVERIZED FUEL SUCH AS COAL AND THE LIKE

Frederick L. Dornbrook and Montrose K. Drewry, Milwaukee, Wis., assignors to The Milwaukee Electric Railway and Light Company, Milwaukee, Wis., a corporation of Wisconsin Application March 28, 1931, Serial No. 525,940

6 Claims. (Cl. 202—108)

This invention relates to improvements in apparatus for distilling by-products from pulverized coal.

By way of example, in the ordinary power plant for the production of electrical energy, fuel is fed to a furnace and burned therein and the heat from the burning fuel boils water circulating within a boiler and generates steam. The steam thus generated is used to operate a steam engine, which in turn operates a generator for generating the electrical energy.

In some power or electrical generating plants it has been found practical and advantageous to use pulverized coal as the fuel for the furnace and boiler, and the present invention has special reference to a power plant wherein pulverized coal is the fuel utilized.

In such installations, valuable volatile constituents of coal are burned in the boiler furnace for simply their heat value. Since their value as coal gas, coal tar or other by-products, is considerably in excess of their heat value, pre-distillation conserves their special utility and realizes a profit from the process.

The present invention concerns itself with an apparatus which may be an adjunct to the regular pulverized coal storage type system in general use and has as its primary object the provision of an apparatus for so utilizing pulverized fuel in a power plant that pre-distillation of the fuel may be efficiently and satisfactorily accomplished, so as to produce and conserve as commercial by-products gas and tar, and permitting the resultant coke to be used as the fuel for the boiler furnace.

A further object of the invention is to provide an apparatus which may be applied to an electrical generating plant wherein a distilling apparatus is interposed between the fuel bunker and the boiler and as fuel is delivered from the bunker to the distilling apparatus the fuel is carbonized and the gases and tars separated therefrom and taken away and stored for commercial purposes while the residue of coke is fed directly into the boiler furnace where it burns and furnishes heat for the boiler.

Most coals, when heated to distillation temperatures, become soft and fuse and cake into larger and firm pieces, which pieces ordinarily clog distillation equipment unless special attention is exercised. The present invention further provides in a coal distillation apparatus, a novel type of oxidizer, which, in the present equipment, renders the coal non-caking by thoroughly exposing it to a high temperature gas containing oxygen. Due to the treatment of the coal in the oxidizer, part of the oxygen is absorbed and the coal leaves the oxidizer so altered that it will not cake upon being heated to the distillation temperature.

A further object of the invention is to provide an apparatus of the class described, including the provision of and use of a novel type of coal gas off-take system having the following essential and important features:

(1) The coal gas distilled from the coal is kept entirely separate from the heating gas whereby dilution of the coal gas is entirely eliminated and maximum heating value per cubic foot is insured.

(2) Maximum temperatures encountered by the coal gas are such that no thermal decomposition occurs which might decrease its heating value per unit of volume.

(3) Maximum value tars are obtained from the coal gas because the same are not deteriorated by exposure to high temperatures.

(4) in the present apparatus and method applicable thereto the coal gas is caused to filter through the pulverized coal and into the screened gas off-take pipes at low velocity whereby the discharged coal gas is exceedingly clean and furnishes clean tar and gas.

(5) Condensation of volatile products in the gas off-take system is prevented by the concurrent flow of coal and coal gas because after the gas has been evolved, it must pass through hotter temperatures, insuring non-deposition of any liquids.

A further object of the invention is to provide an apparatus for distilling by-products from pulverized coal prior to burning the coal in a boiler furnace which is very simple, which is economical and efficient, and which is well adapted for the purposes described.

With the above and other objects in view the invention consists of the improved apparatus for distilling by-products from pulverized coal, and its parts, and combinations, as set forth in the claims, and all equivalents thereof.

In the accompanying drawings in which the same reference characters indicate the same parts in all of the views:

Fig. 1 is a vertical sectional view of a boiler furnace equipped with the improved distillation apparatus;

Fig. 2 is a vertical sectional view, on a larger scale, of the carbonizer employed in the present apparatus;

Fig. 3 is a cross-sectional view taken on line 3—3 of Fig. 2 and on a larger scale;

Fig. 4 is an enlarged longitudinal vertical sectional view of the oxidizer employed in the present apparatus; and Fig. 5 is a sectional view thereof taken on line 5—5 of Fig. 4.

Referring now more particularly to the drawings, with special reference to Figs. 1, 4 and 5 thereof, it will appear that the numeral 8 designates an oxidizer, which oxidizer is in the form of an enclosed tank or container, of a substantial size. One side of the container, toward one end thereof, and intermediate the upper and lower ends of the container, is entered by a pulverized coal inlet pipe 20 which branches from a pipe 45 which pipe leads from a coal pulverizer (not shown). Opposite the coal inlet pipe 20, the container 8 is entered by a flue gas pipe 10. As shown clearly in Fig. 1 the source of the flue gas is the upper portion of the boiler furnace 11. The flue gas pipe extends into the upper portion of the boiler furnace and extends outwardly of the boiler furnace into a header 12 and the flue gas pipe 10, of a reduced diameter, extends from the header 12 into the oxidizer, in the manner previously mentioned, and shown particularly in Figs. 4 and 5. Within the lower portion of the container 8, extending lengthwise of the same, is a revolving paddle wheel 13. The revolving paddle wheel has its central shaft portion 14 suitably journaled in bearings in opposite ends of the container and an outwardly projecting portion of the shaft 14 carries a pulley wheel 15 about which a belt 16 is extended. The belt is connected with a suitable source of motive power (not shown).

In the proper functioning of the oxidizer, pulverized coal enters the oxidizer uniformly through the tubular member 20, and heating and oxidizing flue gas enters the oxidizer through the tubular connection 10. The revolving paddle wheel 13 is driven at a desired speed and functions to keep the pulverized coal and the introduced heating and oxidizing gas in constant agitation. Extending through the upper portion of the container 8 is an elongated tubular member 17 and the lower end portion of said member 17, within the container 8 fits into a vertically adjustable pipe section 18. Adjustable raising and lowering mechanism 19, accessible from exteriorly of the container 8, permits the adjustable extension 18 to be moved with respect to the inner end of the member 17 to locate, as desired, the entrance end of the member 18. Upon starting the apparatus, coal concentrates in the oxidizer container until the rate of removal equals the rate of supply. The accumulation of coal therein increases the time of treatment, which, like temperature and turbulence, is necessary to destroy the caking properties of the coal.

The vertically adjustable connection 18 on the pipe 17 is arranged so that by adjusting the same the amount of coal accumulation may be governed, and changes in the speed of the paddle wheel 13 can accomplish the same results within certain limits. However, it is obvious that concentration of the coal is greatest in the vicinity of the paddle wheel and is the least near the upper portion of the oxidizer container. A steady flow of gas and entrained coal will pass out of the oxidizer through the members 18 and 17.

It has been found that the addition of from two percent to five percent of oxygen to the weight of the coal will render it non-caking upon the coal being rapidly heated above the distillation temperature. It is desirable to maintain a temperature of approximately 600 degrees Fahrenheit within the oxidizer and this is accomplished by the introduction of the flue gas from the boiler furnace, and said flue gas contains from five to ten percent free oxygen. In addition to the heat derived within the oxidizer from the flue gas, heat is also derived from the chemical reaction of the coal and oxygen. This together with the vigorous agitation afforded by the paddle wheel will effectively destroy all caking properties of the coal within from ten seconds to several minutes, depending upon the size of the coal particles. Small particles of coal are swept almost directly through the oxidizer with the heating gases, while the larger particles, since they are less easily swept upwardly toward the off-take member 18, remain within the oxidizer for a longer period.

Adjustment of the paddle wheel speed and the off-take height of the member 18 governs the accumulation of coal to within certain limits, causing reasonable power consumption of the paddle wheel. The agitation of the coal particles is also important in that relatively fast and constant movement of the same prevents spontaneous combustion and resultant firing. It should also be observed that the coal and gas off-take 18—17 is at the end of the tank opposite from that at which the coal and gas enter.

The peculiar type of oxidizer employed is important in that it allows a controllable quantity of coal to accumulate and thereby the available time for oxidation may be set at will. The oxidizer employed also retains larger coal particles longer than the small particles so that the caking properties of all type of particles are reduced to an equal extent. The oxidizer also obtains the maximum contact of oxygen and coal with a minimum power expenditure. Uniform oxidation of all coal particles is insured because of the concurrent travel of coal and gas between the inlet and outlet.

A standard cyclone separator 23 is mounted directly over a carbonizer member 21 and the lower end of the cyclone collector opens into the upper portion of said carbonizer. The coal and gas off-take pipe 17 from the oxidizer extends to and opens into an upper portion of the cyclone collector tangentially. The said cyclone separator serves to effect a separation of the oxidized coal from the oxidizing flue gas. The efficiency of the collector need not be perfect since dusty gas therewithin leaves the collector through a pipe 24 and said pipe extends to a header 25 from which header a pipe 26 leads to a connection 27 opening into the furnace at the point where the entrained coal is burned. The heat value of any volatile products removed in the oxidation process is thus conserved, and the loss to the process is negligible. The lower tapered end portion of the cyclone separator is provided with a rotary feeder 28 through which coal passes and is discharged from the upper portion of the carbonizer container 21. The rotary feeder serves as a positive seal between the cyclone separator and carbonizer, assisting maintenance of the steam atmosphere in the carbonizer, slightly above atmospheric pressure, to inhibit spontaneous combustion of the heated coal, the steam being introduced into the carbonizer through the pipe 46.

The carbonizer 21 is in the form of a large container of rectangular form having a lower tapered portion 21'. Within the lower portion of the main body portion of the enclosure the carbonizing apparatus is disposed. Said carbonizing apparatus comprises a plurality of sheet metal heating elements 29 of envelope-like form, as shown most clearly in Figs. 2 and 3. Depending into the container 21 from the flue gas header 12 are a plurality of flue gas inlet pipes 30. An end portion of a heating element 29 opens into each of the pipes 30 so that hot flue gas will be introduced into the envelope-like heating elements 29. The opposite ends of the heating elements open into flue gas outlet pipes 31 disposed within the opposite side of the container 21 and said pipes 31 extend upwardly outwardly of the container and discharge into the header 25 from which the pipe 26 extends which conducts the gases back to the boiler furnace. Baffles 32 and 33 are positioned within the envelope-like heating elements to cause a flow of gases therethrough in the manner indicated by arrows in Fig. 2. There are also within the container 21 forming part of the carbonizing apparatus, vertical coal gas off-take pipes 34, which pipes are perforated and covered with fine screen throughout their length. The lower end portions of said pipes 34 connect with horizontal coal gas manifolds 35, which manifolds discharge into a coal gas off-take header 36 extended exteriorly of the container 21.

With reference to Fig. 1, it will appear that pulverized coal branch pipes 20 lead off from the pipe 45, the upper branch pipe 20 extending to the oxidizer and the lower pipe 20 extending to the bin portion of the carbonizer 21. Normally the lowermost valve 22 is closed and therefore all the pulverized coal is directed into the oxidizer and is treated there before reaching the bin 21. This is the case during usual distillation operations. However, if for any reason the distillation apparatus is not functioning, then the upper valve 22 is closed and the lower valve 22 is opened, whereby untreated pulverized coal is routed direct to said bin or container 21. In this event no heat is applied to the carbonizer plates and the operation of the apparatus is the same as that practiced in similar apparatuses having no distillation apparatus incorporated therewith.

In the functioning of the carbonizer, oxidized coal at approximately 600 degrees Fahrenheit settles slowly downwardly past the heating elements 29, which heating elements heat the coal beyond the primary distillation zone of about 700 degrees Fahrenheit to 900 degrees Fahrenheit. As previously mentioned, hot flue gas is used as a convenient medium and is caused to flow through the heating elements to heat the downwardly settling coal. Maximum efficiency is gained by having the gas and coal flow in opposite directions, although the gas is confined and does not actually contact with the coal. Inasmuch as pulverized coal has relatively low heat transfer characteristics the heating elements 29, having large surface areas, compensate for this. The absence of oxygen within the carbonizer eliminates the possibility of oxidation of metal of the heating elements.

Coal gas is evolved from the coal between the heating elements 29 and said coal gas travels horizontally to the screened gas off-take pipes 34. Pulverized coal permits passage of a considerable gas flow, especially upwardly, and a head of coal above the screened open ends of the gas off-take pipes effectively seals the same from the steam space thereabove. Suction of an exhauster positioned as at 37 in Fig. 2, which acts on the gas off-take pipes, or slight steam pressure above the coal within the container 21, introduced thereinto through a steam connection 46, maintains the gas flow tendency downwardly, but little flow occurs in this direction due to the packing tendency of the coal. The coal gas taken off through the header 36 is cooled and collected in any standard apparatus for that purpose (not shown) and tars are condensed.

After carbonization in the member 21, the resulting semi-coke, still in pulverized or dust form, gravitates through the lower tapered portion 21' of the container to a suitable feeder 38, which feeder is driven from a suitable source of power (not shown) by a belt 39. The feeder passes the semi-coke dust into the lower vertical tubular connection 27 from where it is introduced directly into the boiler furnace, and with the introduced coke, gas, passing through the pipe 26, is also introduced into the boiler furnace. The introduced semi-coke dust has a temperature of about 1000 degrees Fahrenheit, which compensates for its reduced volatile content in facilitating combustion and it is burned like untreated coal. The heat generated from said burning fuel boils water within a boiler member 40 above the furnace and steam is taken off through a pipe 41 for operating any desired equipment.

In connection with the carbonizing apparatus and the coal gas off-take system, it should be noted that the coal gas is maintained entirely separately from the heating gas, whereby any dilution of the coal gas is eliminated. The maximum temperatures encountered by the coal gas are such that no thermal decomposition occurs which will decrease its heating value per unit of volume. Maximum value tars are obtained from the coal gas because there is no deterioration due to exposure to high temperatures. The coal gas filters through the pulverized coal and into the screened gas off-take pipes 34 at low velocity and hence it is exceedingly clean as discharged and furnishes clean tar and gas. Condensation of volatile products in the gas off-take system is prevented by the concurrent flow of coal and coal gas. After the gas is evolved it must pass through hotter temperatures, insuring non-deposition of any liquids.

With relation to the carbonizer apparatus it should be observed that the heating elements are formed with inexpensive steel heat transfer surfaces and utilize relatively low temperature flue gases for carbonization. Due to the slow downward rate of coal travel the time for carbonization reaction is very ample. The prevention of deterioration of coal gas and tar products is possible because the maximum temperatures are considerably less than those at which cracking to inferior constituents occurs. The facility of combustion of the coke is obtained by reason of the maintenance of the high temperature (about 1000 degrees Fahrenheit) as the coke is fed into the furnace.

Although the apparatus of this invention has been described and illustrated as applied to a furnace such as the furnace of a steam-generating plant, the invention is to be considered as sufficiently broad to include the apparatus when not so used. Obviously the advantages of the fuel-treatment apparatus including the oxidizer and carbonizer will be realized insofar as the production of the distilled gases and powdered coke is concerned when not used with a furnace. The apparatus is merely one which is peculiarly adapted with greater advantage for use with a furnace.

From the foregoing description it will be seen that the improved apparatus for distilling by-products from pulverized coal is both simple and novel and is well adapted for the purposes set forth.

What is claimed as the invention is:

1. In combination with a pulverized fuel combustion chamber and a source of pulverized fuel, connecting means therebetween comprising a carbonizer having heaters therein and an oxidizer, means for feeding fuel to said oxidizer and means for feeding oxidized fuel from said oxidizer to said carbonizer, means for withdrawing gas from said combustion chamber and conveying some of said gas into said heaters in said carbonizer and conveying some of said gas into said oxidizer, and means for conveying said gas from said heaters and said oxidizer back to said combustion chamber.

2. In combination with a pulverized fuel combustion chamber and a source of pulverized fuel, connecting means therebetween comprising a carbonizer and an oxidizer, means for feeding pulverized fuel to said oxidizer and means for feeding oxidized fuel from said oxidizer to said carbonizer, means for withdrawing gas from said combustion chamber, and for conveying oxygen-bearing gas in commingling association with said pulverized fuel in said oxidizer, means for separating said commingled gas and fuel, and means for conveying said gas from said oxidizer back to said combustion chamber.

3. In combination with a pulverized fuel combustion chamber and a source of pulverized fuel, connecting means therebetween comprising a carbonizer having a heater therein and an oxidizer, means for feeding pulverized fuel to said oxidizer, means for feeding oxidized fuel from said oxidizer to said carbonizer, and means for feeding coke particles from said carbonizer to said combustion chamber, means for withdrawing oxygen-containing gas from said combustion chamber, means for dividing the withdrawn gas and for conveying some of said gas in commingling association with said pulverized fuel in said oxidizer and for conveying the remainder of said gas into said heater in said carbonizer, and means for conveying the gas in said oxidizer and the gas in the heater back to said combustion chamber.

4. In combination with a pulverized fuel combustion chamber and a source of pulverized fuel, connecting means therebetween comprising a carbonizer having a heater therein and an oxidizer, means for feeding pulverized fuel to said oxidizer, means for feeding oxidized fuel from said oxidizer to said carbonizer, and means for feeding coke particles from said carbonizer to said combustion chamber, means for withdrawing oxygen-containing gas from said combustion chamber, means for dividing the withdrawn gas and for conveying some of said gas in commingling association with said pulverized fuel in said oxidizer and for conveying the remaining of said gas into said heater in said carbonizer, means for conveying the gas in said oxidizer and the gas in the heater back to said combustion chamber, and means for withdrawing volatile products of carbonization from said carbonizer.

5. In an apparatus for treating pulverized fuel, an oxidizer comprising an enclosed vessel, a pulverized fuel delivery member entering the lower end portion of said vessel, an oxidizing and heating gas delivery member entering the same lower end portion of said vessel, an agitator within said vessel, and a vertically adjustable fuel and gas discharge pipe extending outwardly from the upper opposite end portion of said vessel, said discharge pipe depending into said vessel whereby by adjustment the outlet end thereof is raised and lowered with respect to the height of said vessel.

6. In combination, a furnace, an oxidizer, means for introducing a stream of pulverized coal from a source of supply into the oxidizer, means for conveying oxygen-containing flue gas from the furnace to the oxidizer, an agitator within the oxidizer, means for separating flue gas from the coal after the coal has been treated by the former, a carbonizer, an enclosed heating element therewithin and sealed from the contents of the interior of the carbonizer, means for discharging coal separated from the flue gas into the carbonizer, means for conveying flue gas from the furnace into said heating element, said flue gas in the heating element being maintained isolated from the coal in the carbonizer, means for withdrawing coal gas from the carbonizer, and means for conveying powdered carbonized coal directly from the carbonizer to the furnace.

FREDERICK L. DORNBROOK.
MONTROSE K. DREWRY.